United States Patent
Mori (10) Patent No.: US 8,587,567 B2
(45) Date of Patent: Nov. 19, 2013

(54) DISPLAY APPARATUS AND LUMINANCE CONTROL METHOD

(75) Inventor: Kengo Mori, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 1168 days.

(21) Appl. No.: 12/312,184

(22) PCT Filed: Nov. 5, 2007

(86) PCT No.: PCT/JP2007/071484
§ 371 (c)(1),
(2), (4) Date: Jul. 8, 2009

(87) PCT Pub. No.: WO2008/056630
PCT Pub. Date: May 15, 2008

(65) Prior Publication Data
US 2010/0090939 A1    Apr. 15, 2010

(30) Foreign Application Priority Data
Nov. 7, 2006 (JP) ................................ P2006-301602

(51) Int. Cl.
*G06F 3/038* (2013.01)
*H01J 7/24* (2006.01)

(52) U.S. Cl.
USPC ........................................ 345/204; 315/117

(58) Field of Classification Search
USPC ................. 315/291, 307, 310, 312, 112, 117;
345/204, 207, 691, 84, 87
See application file for complete search history.

(56) References Cited

U.S. PATENT DOCUMENTS

| | | | | |
|---|---|---|---|---|
| 6,066,920 A | * | 5/2000 | Torihara et al. | 315/50 |
| 6,157,143 A | * | 12/2000 | Bigio et al. | 315/307 |
| 6,974,217 B2 | * | 12/2005 | Kimura et al. | 353/69 |
| 7,502,009 B2 | * | 3/2009 | Kang et al. | 345/102 |
| 2005/0088102 A1 | * | 4/2005 | Ferguson et al. | 315/149 |

FOREIGN PATENT DOCUMENTS

| | | |
|---|---|---|
| JP | 4-141995 | 5/1992 |
| JP | 2001-169273 | 6/2001 |
| JP | 2001-313191 | 11/2001 |
| JP | 2003-243193 A | 8/2003 |
| JP | 2004-342556 | 12/2004 |
| JP | 2006-66220 | 3/2006 |
| JP | 2006-153954 | 6/2006 |

OTHER PUBLICATIONS

Notification of Reason(s) for Rejection dated Dec. 20, 2011, with English translation.

* cited by examiner

*Primary Examiner* — Minh D A
(74) *Attorney, Agent, or Firm* — McGinn Intellectual Property Law Group, PLLC (57) ABSTRACT

A display apparatus according to the present invention using a cold cathode fluorescent lamp as a light source includes: a gradient detector which detects a condition in which one end of the cold cathode fluorescent lamp is disposed higher than an other end thereof; and a controller which conducts control so that emitted luminance of the cold cathode fluorescent lamp is inhibited when the condition in which the one end of the cold cathode fluorescent lamp is disposed higher than the other end thereof is detected by the gradient detector.

16 Claims, 8 Drawing Sheets

DISPLAY APPARATUS AND LUMINANCE CONTROL METHOD

TECHNICAL FIELD

The present invention relates to a luminance control method for a image display apparatus, and more particularly relates to a luminance control method for a liquid crystal display (LCD) which displays image signals of prescribed format used in a personal computer (PC), work station (WS), television (TV) or the like.

Priority is claimed on Japanese Patent Application No. 2006-301602 filed Nov. 7, 2006, the content of which is incorporated herein by reference.

BACKGROUND ART

Figure 10:
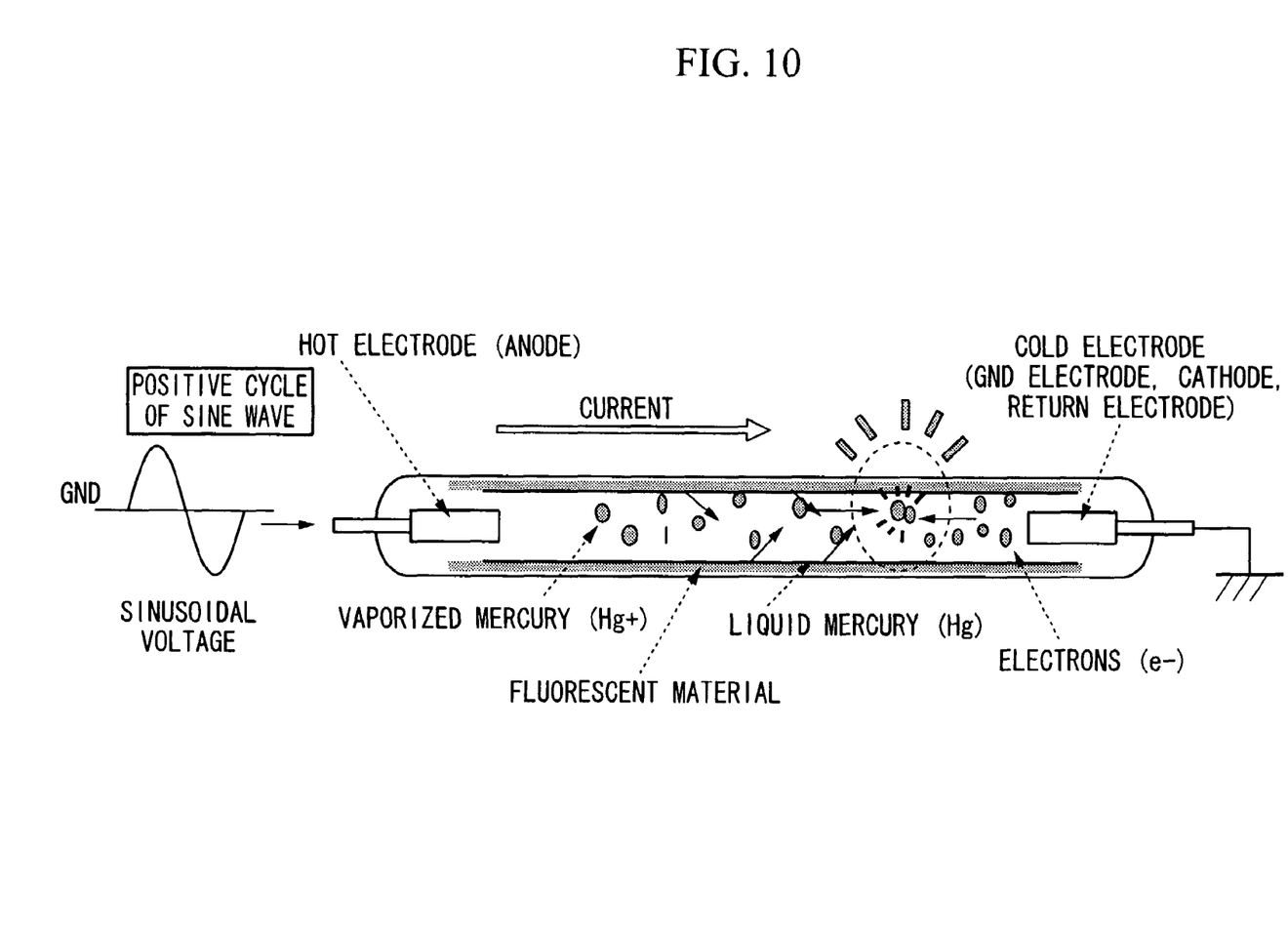
FIG. 10 is an explanatory view which shows the light-emitting principle of a CCFL.

Conventionally, as the light source in liquid crystal display, it is the CCFL (cold cathode fluorescent lamp) which has been used most frequently. The light-emitting principle of the CCFL is identical to that of fluorescent lamps commonly used in offices and households. As shown in FIG. 10, ultraviolet rays are discharged due to occurrence of a chemical reaction of vaporized mercury (Hg+) and electrons (e−) existing inside the lamp, and these ultraviolet rays are perceived as light through the fluorescent material that coats the inside of the lamp. The mercury inside the lamp forms an alloy with metallic material scattered by the electrodes, becoming a mercury alloy (amalgam) of low vapor pressure, and a film of this alloy is produced on the electrodes and fluorescent material inside the lamp. When the mercury in the lamp has turned entirely into alloy, a state is reached where luminance has completely ceased—this point in time constitutes the life of the lamp.

As conventional art, a color-TV door phone apparatus is known which enables the luminance of a cold cathode fluorescent lamp to be stably controlled immediately after activation by controlling the current that flows to the lamp based on the temperature of the cold cathode fluorescent lamp (see, e.g., Patent document 1 (FIG. 3)).

[Patent document 1] Japanese Unexamined Patent Application, First Publication No. 2001-169273

DISCLOSURE OF THE INVENTION

Problems to be Solved by the Invention

Figure 11:
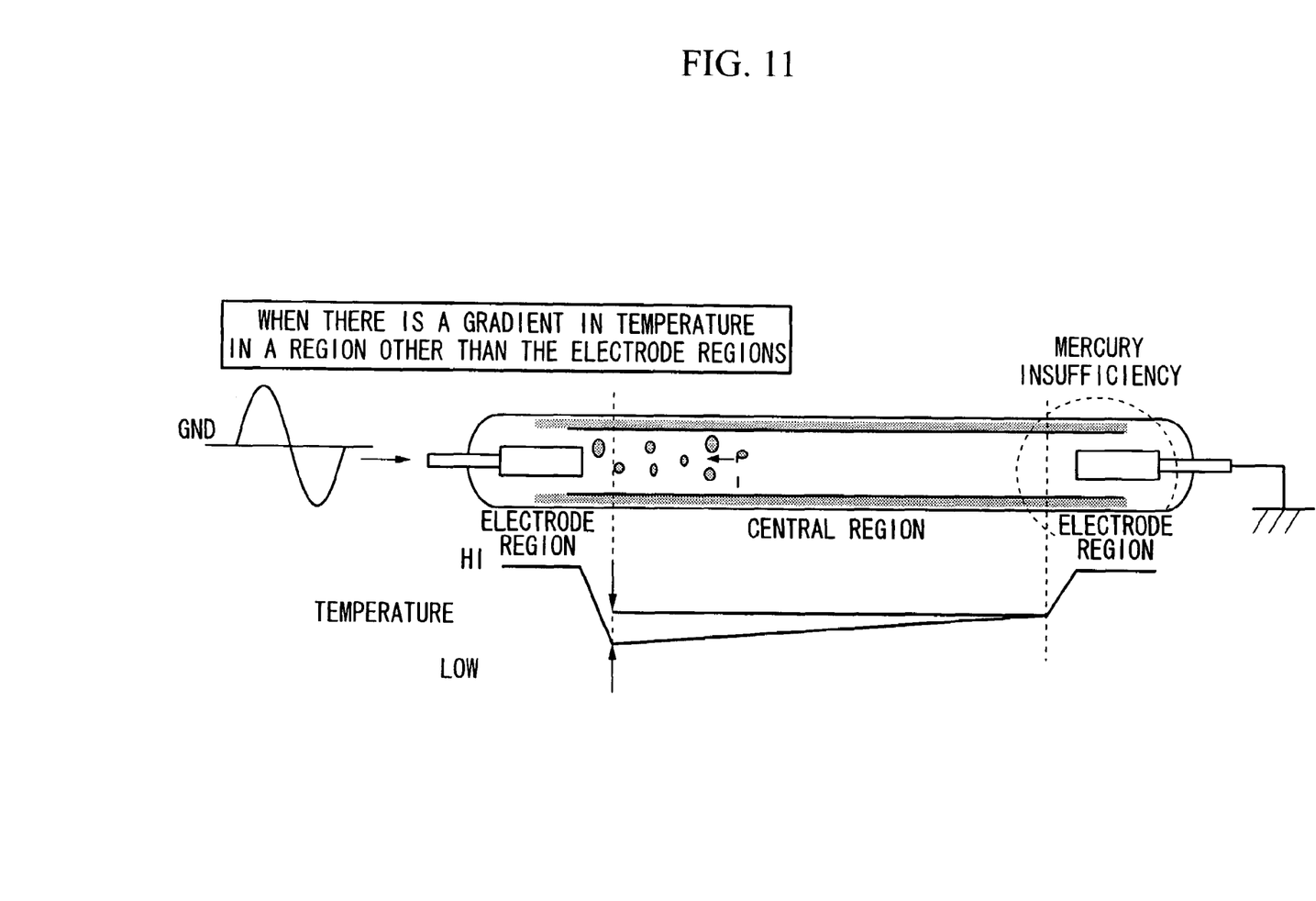
FIG. 11 is an explanatory view which shows a cataphoresis phenomenon.

Incidentally, when there is a temperature gradient in the region apart from the electrodes within the CCFL, and a temperature difference between the electrodes, as shown in FIG. 11, a phenomenon occurs where the vaporized mercury inside the CCFL is biased toward the low temperature side, and luminance decreases on the high temperature electrode side due to electric discharge under rare-gas conditions. This phenomenon is termed a cataphoresis phenomenon; the liquid crystal panel is perceived as having luminance irregularities and color irregularities, and degradation of the CCFL is accelerated.

Particularly with respect to high-intensity CCFLs, there is the problem that the two electrodes become a vertical positional relation when the CCFL is vertically disposed, and that heat increases during lighting when lighting is conducted at maximum luminance, resulting in a growing temperature difference between the top and bottom of the lamp, and leading to occurrence of a cataphoresis phenomenon. Moreover, in conjunction with enlargement and widening of liquid crystal panels using CCFLs as the light source, there is the problem that the form of the CCFL tends to spread in the axial direction, and that when it is vertically disposed, conditions arise in which the temperature difference between the two electrodes tends to further widen, leading to occurrence of a cataphoresis phenomenon.

The present invention has been made in light of such circumstances, and its object is to offer a display apparatus and a luminance control method enabling avoidance of a cataphoresis phenomenon, and prevention of degradation acceleration in CCFLs.

Means for Solving the Problem

A display apparatus according to a first aspect of the present invention using a cold cathode fluorescent lamp as a light source includes: a gradient detector which detects a condition in which one end of the cold cathode fluorescent lamp is disposed higher than an other end thereof; and a controller which conducts control so that emitted luminance of the cold cathode fluorescent lamp is inhibited when the condition in which the one end of the cold cathode fluorescent lamp is disposed higher than the other end thereof is detected by the gradient detector.

A display apparatus according to a second aspect of the present invention using a cold cathode fluorescent lamp as a light source includes: a temperature detector which detects an internal temperature of a housing of the display apparatus; a time measurement unit which measures elapsed time from initiation of lighting of the cold cathode fluorescent lamp; a gradient detector which detects a condition in which one end of the cold cathode fluorescent lamp is disposed higher than an other end thereof; and a controller which projects a saturation temperature of the cold cathode fluorescent lamp based on the elapsed time and an internal temperature difference of the housing between a time of the initiation of lighting of the cold cathode fluorescent lamp and a present time, and which conducts control so that emitted luminance of the cold cathode fluorescent lamp is inhibited in accordance with the saturation temperature, when the condition in which the one end of the cold cathode fluorescent lamp is disposed higher than the other end thereof is detected by the gradient detector.

The display apparatus according to the second aspect of the present invention may further include an external temperature detector which detects an external temperature of the housing, and the controller may conduct correction of the projected saturation temperature according to a temperature difference between an external temperature of the housing and an internal temperature of the housing at a present time.

A display apparatus according to a third aspect of the present invention using a cold cathode fluorescent lamp as a light source includes: a gradient detector which detects conditions in which one end of the cold cathode fluorescent lamp is disposed higher than an other end thereof; a temperature detector which detects a temperature of the cold cathode fluorescent lamp; and a controller which conducts control so that emitted luminance of the cold cathode fluorescent lamp is inhibited according to the temperature detected by the temperature detector, when the condition in which the one end of the cold cathode fluorescent lamp is disposed higher than the other end thereof is detected by the gradient detector.

A display apparatus according to a fourth aspect of the present invention using a cold cathode fluorescent lamp as a light source includes: a first temperature detector which detects a temperature at one end of the cold cathode fluorescent lamp; a second temperature detector which detects a temperature at an other end of the cold cathode fluorescent lamp; and a controller which conducts control so that emitted luminance of the cold cathode fluorescent lamp is inhibited according to a temperature difference between the temperature detected by the first temperature detector and the temperature detected by the second temperature detector.

In the display apparatus according to the fourth aspect of the present invention, a plurality of the cold cathode fluorescent lamps may be provided with the first and second temperature detectors, and the controller may control an emitted luminance of a cold cathode fluorescent lamp having a highest temperature difference among temperature differences between both ends of the respective cold cathode fluorescent lamps, and control emitted luminance so that luminance control of cold cathode fluorescent lamps other than the one having the highest temperature difference is conformed to the emitted luminance of the cold cathode fluorescent lamp having the highest temperature difference.

The display apparatus according to the present invention may further include an image display unit which displays a message, and the controller may cause the image display unit to display a message indicating that control of emitted luminance is performed when control of emitted luminance of the cold cathode fluorescent lamp is conducted.

A luminance control method according to a fifth aspect of the present invention for a display apparatus using a cold cathode fluorescent lamp as a light source includes: a gradient detection step of detecting a condition in which one end of the cold cathode fluorescent lamp is disposed higher than an other end thereof; and a control step of conducting control so that emitted luminance of the cold cathode fluorescent lamp is inhibited when the condition in which one end of the cold cathode fluorescent lamp is disposed higher than the other end thereof is detected by the gradient detection step.

A luminance control method according to a sixth aspect of the present invention for a display apparatus using a cold cathode fluorescent lamp as a light source includes: a temperature detection step of detecting an internal temperature of a housing of the display apparatus; a time measurement step of measuring elapsed time from initiation of lighting of the cold cathode fluorescent lamp; a gradient detection step of detecting a condition in which one end of the cold cathode fluorescent lamp is disposed higher than an other end thereof; and a control step of projecting a saturation temperature of the cold cathode fluorescent lamp based on the elapsed time and an internal temperature difference of the housing between a time of the initiation of lightning of the cold cathode fluorescent lamp and a present time, and conducting control so that emitted luminance of the cold cathode fluorescent lamp is inhibited in accordance with the saturation temperature, when the condition in which the one end of the cold cathode fluorescent lamp is disposed higher than the other end thereof is detected by the gradient detection step.

A luminance control method according to a seventh aspect of the present invention for a display apparatus using a cold cathode fluorescent lamp as a light source includes: a gradient detection step for detecting a condition in which one end of the cold cathode fluorescent lamp is disposed higher than an other end thereof; a temperature detection step of detecting a temperature of the cold cathode fluorescent lamp; and a control step of conducting control so that emitted luminance of the cold cathode fluorescent lamp is inhibited according to the temperature detected by the temperature detection step when the condition in which the one end of the cold cathode fluorescent lamp is disposed higher than the other end thereof is detected by the gradient detection step.

A luminance control method according to an eighth aspect of the present invention for a display apparatus using a cold cathode fluorescent lamp as a light source includes: a first temperature detection step of detecting a temperature at one end of the cold cathode fluorescent lamp; a second temperature detection step of detecting a temperature at an other end of the cold cathode fluorescent lamp; and a control step of conducting control so that emitted luminance of the cold cathode fluorescent lamp is inhibited according to a temperature difference between the temperature detected by the first temperature detection step and the temperature detected by the second temperature detection step.

Effect of the Invention

According to the present invention, when a condition is detected which facilitates occurrence of a cataphoresis phenomenon in a cold cathode fluorescent lamp, control is conducted so that emitted luminance of the cold cathode fluorescent lamp is inhibited so as to suppress the amount of heat release, and thereby enlargement of a temperature difference between the two electrodes is prevented. Consequently, it is possible to obtain the effects of enabling avoidance of occurrence of a cataphoresis phenomenon, and enabling prevention of occurrence of luminance irregularities and color irregularities of the cold cathode fluorescent lamp. Moreover, according to an embodiment of the present invention, as acceleration in degradation of the cold cathode fluorescent lamp is inhibited, there is the effect that a display apparatus can be achieved which enables lighting that preserves stable luminance and color over long periods.

REFERENCE SYMBOLS

1 CCFL (cold cathode fluorescent lamp)
2 surface light source
3 inverter circuit
4 controller
5 gradient sensor (gradient detector)
61, 62, 63, 64 temperature sensor
7 timer (time measurement unit)
81, 82, 83, 84 control value table

BEST MODE FOR CARRYING OUT THE INVENTION

First Embodiment

Figure 1:
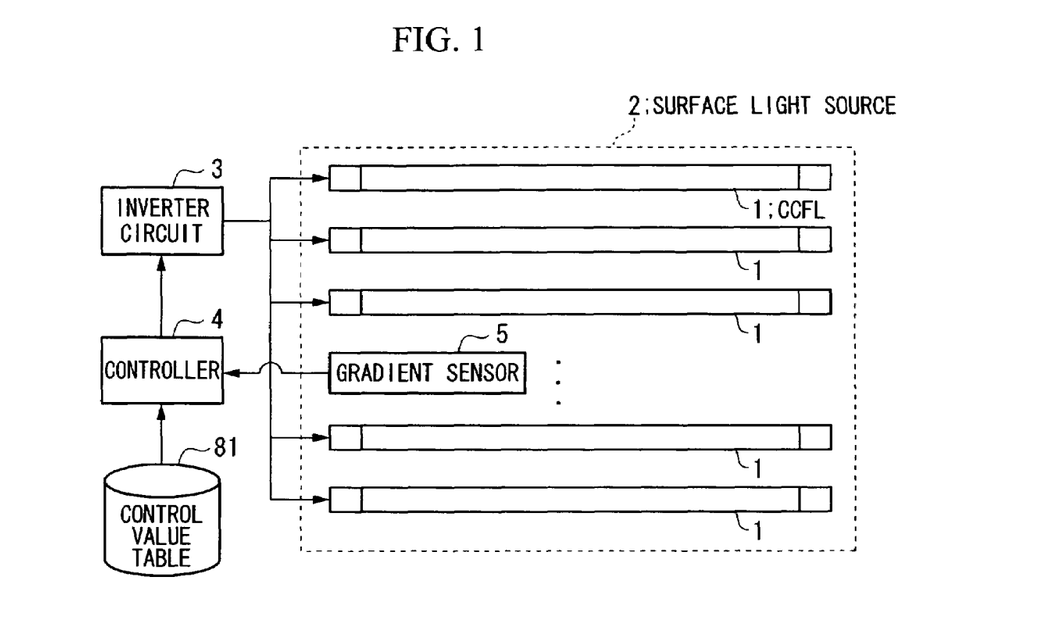
FIG. 1 is a block diagram which shows the configuration according to a first embodiment of the present invention.

Below, a display apparatus according to a first embodiment of the present invention is described with reference to drawings. FIG. 1 is a block diagram which shows the configuration of this embodiment. Reference symbol 1 is a cold cathode fluorescent lamp (hereinafter, "CCFL") used in a light source (backlight) of a liquid crystal display (LCD) that displays video signals having a prescribed format used in a personal computer (PC), work station (WS), television (TV) or the like. According to the size of the screen of the liquid crystal display, a plurality of CCFLs 1 are disposed, and configures a surface light source 2 which illuminates the display with liquid crystal from the back face. In FIG. 1, in order to simplify description, the liquid crystal panel and circuitry for conducting graphics processing are omitted. Reference symbol 3 is an inverter circuit which controls the emitted luminance of the respective CCFLs 1. Reference symbol 4 is a controller which controls screen display operations of the display apparatus and lighting conditions of each CCFL 1 composing the surface light source 2. Reference symbol 5 is a gradient sensor (gradient detector) which detects the degree of inclination of the CCFL 1. The gradient sensor 5 is a sensor which detects conditions in which one end of the CCFL 1 is disposed higher than its other end, and which outputs an angle relative to the horizontal in the axial direction of the CCFL 1. Reference symbol 81 is a control value table in which control values for controlling the emitted luminance of each CCFL 1 are stored. The control value table 81 contains pre-stored control values for conducting light emission at maximum luminance in a state where each CCFL 1 is horizontally disposed, and pre-stored control values for conducting control so that emitted luminance is inhibited even when lighting at maximum luminance is instructed in a state where each CCFL 1 is not horizontal (a state where one end of the CCFL 1 is disposed higher than its other end).

Figure 9:
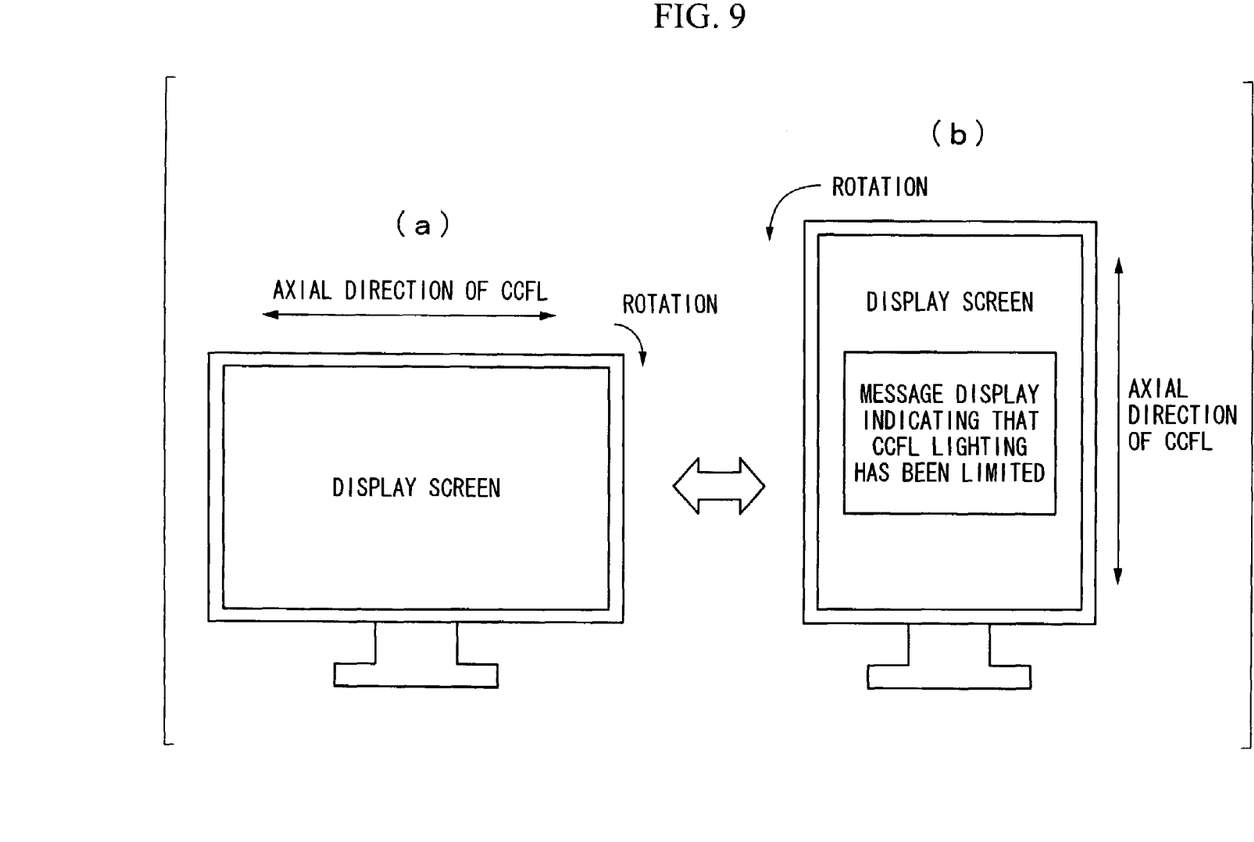
FIG. 9 is an explanatory view which shows a display example of a message providing notification that a lighting restriction has been implemented.

A description of the structure of the display apparatus shown in FIG. 1 is now given with reference to FIG. 9. With respect to the display apparatus, a liquid crystal panel is used whose aspect ratio is not 1, and a light source is provided on the back face where a plurality of CCFLs 1 are disposed so that the long side of the liquid crystal panel coincides with the axial direction of the CCFLs 1. According to the necessity of the user, it is possible to switch between a configuration with a horizontally long screen (see a part (a) of FIG. 9) and one with a vertically long screen (see a part (b) of FIG. 9) by rotating the screen (liquid crystal panel) by 90°. Accordingly, when used with a horizontally long screen, the axial direction of each CCFL 1 is in the horizontal direction, and when used with a vertically long screen, the axial direction of each CCFL 1 is in the vertical direction. However, generally speaking, display apparatuses are often provided with a mechanism for adjusting the elevation angle of the screen. Consequently, when the elevation angle is adjusted from vertical to horizontal, it may happen that the axial direction of the CCFL 1 is not completely vertical (in the direction of gravitational force). However, if the structure does not allow the elevation angle of the screen to be made horizontal, one end of each CCFL 1 is disposed higher than its other end when the screen is vertically long. Accordingly, if the structure does not allow the elevation angle of the screen to be made horizontal, the gradient sensor 5 shown in FIG. 1 may be a sensor which enables detection as to whether the screen is vertically long or whether it is horizontally long (whether in a state where the CCFL 1 may be considered horizontal or in a state where it is not horizontal).

Figure 2:
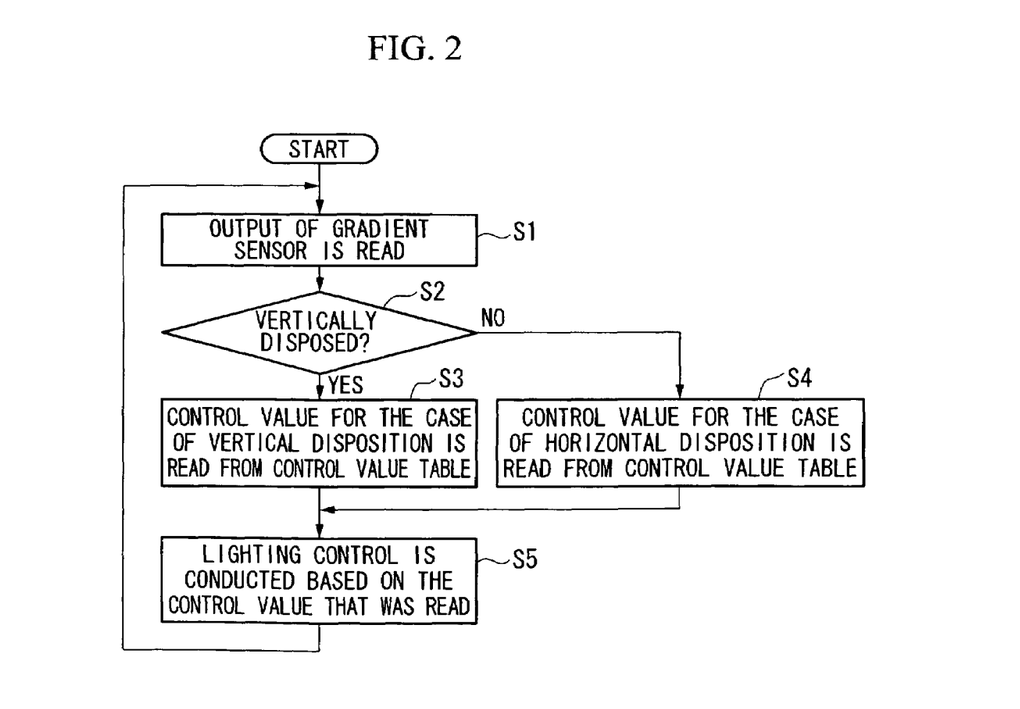
FIG. 2 is a flowchart which shows the operations of the apparatus shown in FIG. 1.

Next, with reference to FIG. 2, a description is given of the operations for conducting lighting control for each CCFL 1 of the display apparatus shown in FIG. 1. FIG. 2 is a flowchart which shows the operations of the display apparatus shown in FIG. 1. First, the power source of the display apparatus is turned on, and if it is necessary to cause the surface light source 2 to conduct light emission, the controller 4 reads the output of the gradient sensor 5 (step S1). Based on the output value of the gradient sensor 5 that was read, the controller 4 then discriminates whether or not the CCFL 1 is in a state of vertical disposition (step S2). As stated above, this discrimination discriminates whether or not conditions exist where one end of the CCFL 1 is disposed higher than its other end so that there exists a state where a temperature difference tends to arise between the two electrodes. As a result of this discrimination, when the CCFL 1 is vertically disposed, the controller 4 reads out the control value for the case of vertical disposition from the control value table 81 (step S3). On the other hand, when the CCFL 1 is not vertically disposed, the controller 4 reads out the control value for the case of horizontal disposition from the control value table 81 (step S4). The controller 4 then performs lighting control by outputting the control value that was read to the inverter circuit 3 (step S5). The controller 4 repetitively performs the processing operations shown in FIG. 2 when it is necessary to have the surface light source 2 conduct light emission.

By this means, when the CCFL 1 is vertically disposed, the control value for lighting at maximum luminance undergo luminance adjustment by a control value for the case of vertical disposition, with the result that vaporized mercury (Hg+) inside the CCFL 1 exists without bias toward one of the electrodes, thereby enabling avoidance of occurrence of a cataphoresis phenomenon, and enabling conduct of stable lighting. Consequently, it is possible to prevent occurrence of luminance irregularities and color irregularities of the CCFL 1 in the display apparatus.

It is also acceptable to have control values corresponding to the degree of inclination (elevation angle when the screen is vertically long) of the CCFL 1 stored in the control value table 81, detect the elevation angle by the gradient sensor 5, and conduct lighting control by the control value corresponding to this detected elevation angle.

Second Embodiment

Figure 3:
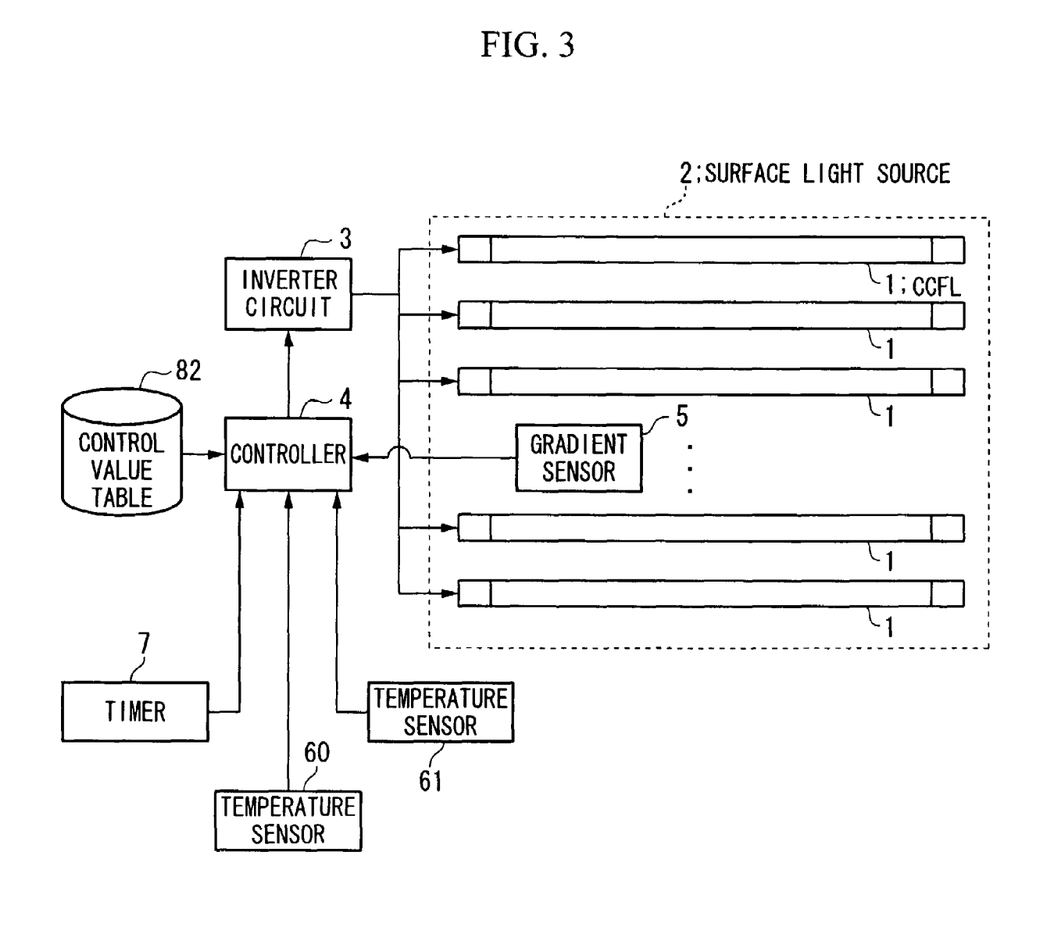
FIG. 3 is a block diagram which shows the configuration according to a second embodiment of the present invention.

Next, a description is given of the display apparatus according to a second embodiment with reference to drawings. FIG. 3 is a block diagram showing the configuration of this embodiment. In this figure, the same reference symbols are given to components which are identical to those of the apparatus shown in FIG. 1, and description thereof is omitted. The display apparatus shown in this FIG. 3 differs from the apparatus shown in FIG. 1 in that it is newly provided with a temperature sensor 60 (external temperature detector) which detects the external temperature (external atmospheric temperature) of the display apparatus, a temperature sensor 61 (temperature detector) which detects the internal temperature of the housing of the display apparatus, and a timer 7 (time measurement unit) which measures the passage of time, and in that the control values recorded in the control value table 82 are different.

Figure 4:
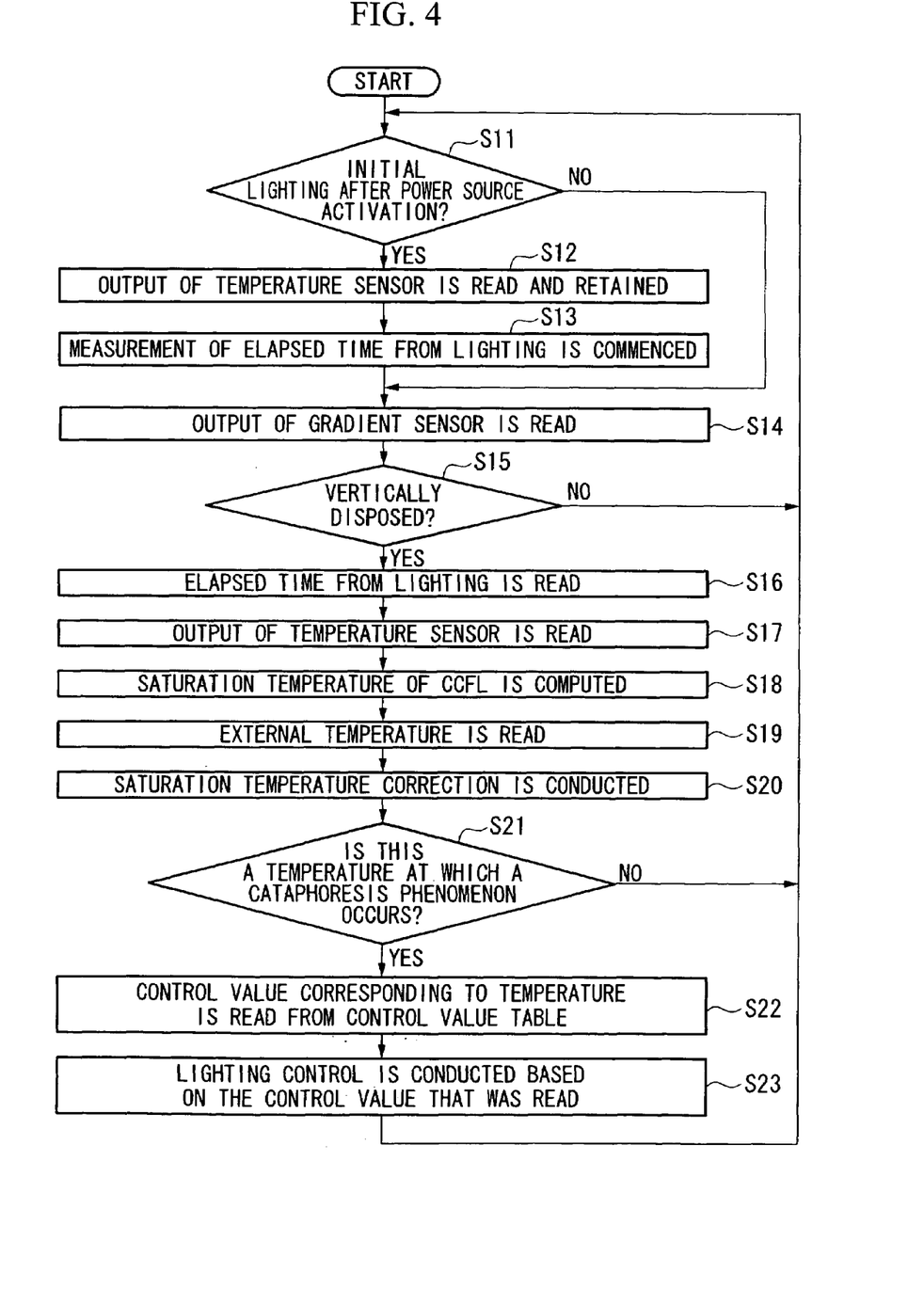
FIG. 4 is a flowchart which shows the operations of the apparatus shown in FIG. 3.

Next, a description is given of the operations of the display apparatus shown in FIG. 3 with reference to FIG. 4. FIG. 4 is a flowchart which shows the operations of the display apparatus shown in FIG. 3. First, when the surface light source 2 is turned on, the controller 4 discriminates whether or not the current point in time is the first lighting of the surface light source after start-up of the power source (step S11). As there are cases where use is conducted without turning on the light source even when the power source has been turned on (power save mode), this discrimination discriminates whether or not this is the first time the surface light source 2 has been turned on since the start of use. If it is determined as a result of this discrimination that this is the first lighting (transition from an extinguished state to an illuminated state), the controller 4 reads the output of the temperature sensor 61, and internally retains this output value (the internal temperature of the housing at the time of initial lighting) (step S12). The controller 4 then instructs the timer 7 to commence measurement of the passage of time from lighting. Upon receiving this instruction, the timer 7 commences time measurement (step S13). The processing which reads this temperature sensor 61, and the processing which commences measurement of elapsed time from lighting are only performed directly after lighting of the surface light source 2.

Next, the controller 4 reads the output of the gradient sensor 5 (step S14). Based on the output value of the gradient sensor 5 that was read, the controller 4 then discriminates whether or not the CCFL 1 is in a state of vertical disposition (step S15). When it is determined as a result of this discrimination that the CCFL 1 is not vertically disposed, the controller 4 deems that conditions inhibiting the occurrence of a cataphoresis phenomenon exist, a return to step S11 ensues, and the processing is repeated.

On the other hand, when it is determined as a result of this discrimination that the CCFL 1 is vertically disposed, the controller 4 reads the elapsed time since lighting from the timer 7 (step S16), and reads the output (internal temperature of the housing at the current point in time) of the temperature sensor 60 (step S17). Based on the temperature difference between the output value (internal temperature of the housing at time of initial lighting) of the temperature sensor 61 read at the time of initial lighting and retained internally and the internal temperature of the housing at the current point in time, and elapsed time since lighting, the controller 4 obtains the saturation temperature of the CCFL 1 by projecting the temperature of the CCFL 1 (step S18). With respect to computation of this saturation temperature, the relations of the saturation temperature determined from the internal temperature difference of the housing at the time of initial lighting and at the current point in time, and the elapsed time are stored in advance in the controller 4, and selection is conducted from among these stored saturation temperatures based on the temperature difference and elapsed time since lighting to obtain the saturation temperature.

Next, the controller 4 reads the external atmospheric temperature by reading the output of the temperature sensor 60 (step S19). The controller 4 then corrects the previously obtained saturation temperature based on the temperature difference of this external atmospheric temperature and the current internal temperature of the housing (step S20). This correction is conducted by prestoring correction values (positive or negative values) which are determined from the temperature difference of the external atmospheric temperature and the current internal temperature of the housing and the obtained saturation temperature values in the controller 4, selecting from among these stored correction values, and adding this correction value to the previously obtained saturation temperature. As the saturation temperature of the CCFL 1 varies according to external atmospheric temperature (declines at times of low temperature, rises at times of high temperature), it is possible to improve the accuracy of the projected saturation temperature by conducting this correction.

Next, the controller 4 discriminates whether or not the corrected saturation temperature is a temperature at which a cataphoresis phenomenon occurs (step S21). When it is determined as a result of this discrimination that the obtained saturation temperature is not a temperature at which a cataphoresis phenomenon occurs, the controller deems that the conduct of lighting control is unnecessary, returns to step S11, and repeats the processing.

On the other hand, when it is determined that the obtained saturation temperature is a temperature at which occurrence of a cataphoresis phenomenon is highly possible, the controller 4 reads the control value corresponding to the obtained saturation temperature from the control value table 82 (step S22). The controller 4 then conducts lighting control by outputting the control value that was read to the inverter circuit 3 (step S23). The controller 4 then returns to step S11, and repeats the above-described control operations.

The processing that corrects the saturation temperature may be conducted as necessary based on the output of the temperature sensor 60, and is not necessarily required. The correction of this saturation temperature is effective when the display apparatus is used at sites where external atmospheric temperature is extremely low or high, or at sites where fluctuations in external atmospheric temperature are large.

By this means, when the CCFL 1 is vertically disposed, luminance adjustment is conducted by control values corresponding to the projected saturation temperature of the CCFL 1, with the result that vaporized mercury (Hg+) inside the CCFL 1 exists without bias toward one of the electrodes, thereby enabling avoidance of occurrence of a cataphoresis phenomenon, and enabling conduct of stable lighting. Consequently, it is possible to prevent occurrence of luminance irregularities and color irregularities of the CCFL 1 in the display apparatus.

Third Embodiment

Figure 5:
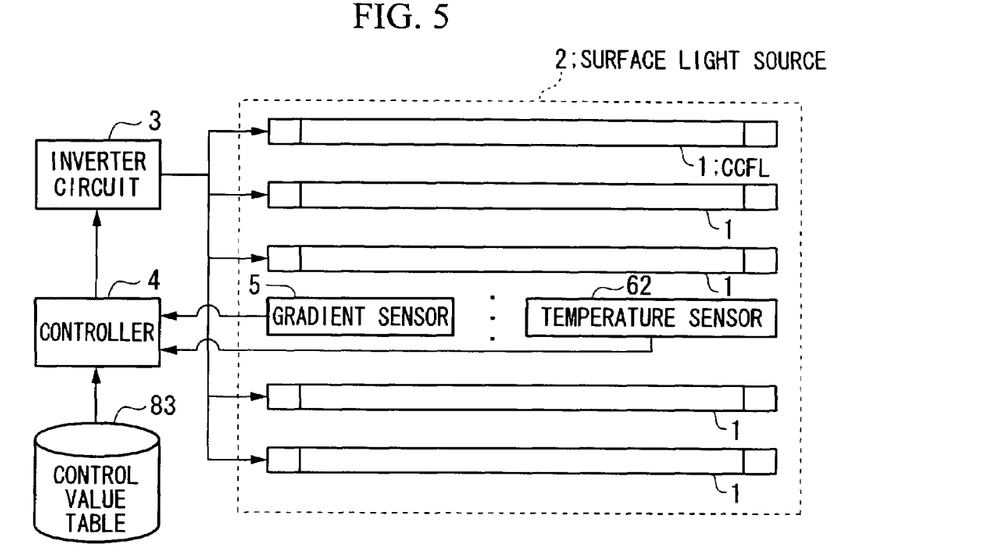
FIG. 5 is a block diagram which shows the configuration according to a third embodiment of the present invention.

Next, a display apparatus according to a third embodiment is described with reference to drawings. FIG. 5 is a block diagram which shows the configuration of this embodiment. In this figure, the same reference symbols are given to components which are identical to those of the apparatus shown in FIG. 3, and description thereof is omitted. The display apparatus shown in this figure differs from the apparatus shown in FIG. 3 in that—in place of the temperature sensor 61 and timer 7—it is newly provided with a temperature sensor 62 (temperature detector) which detects temperature in the vicinity of the CCFL 1 composing the surface light source 2, and in that the control values stored in the control value table 83 are different.

Figure 6:
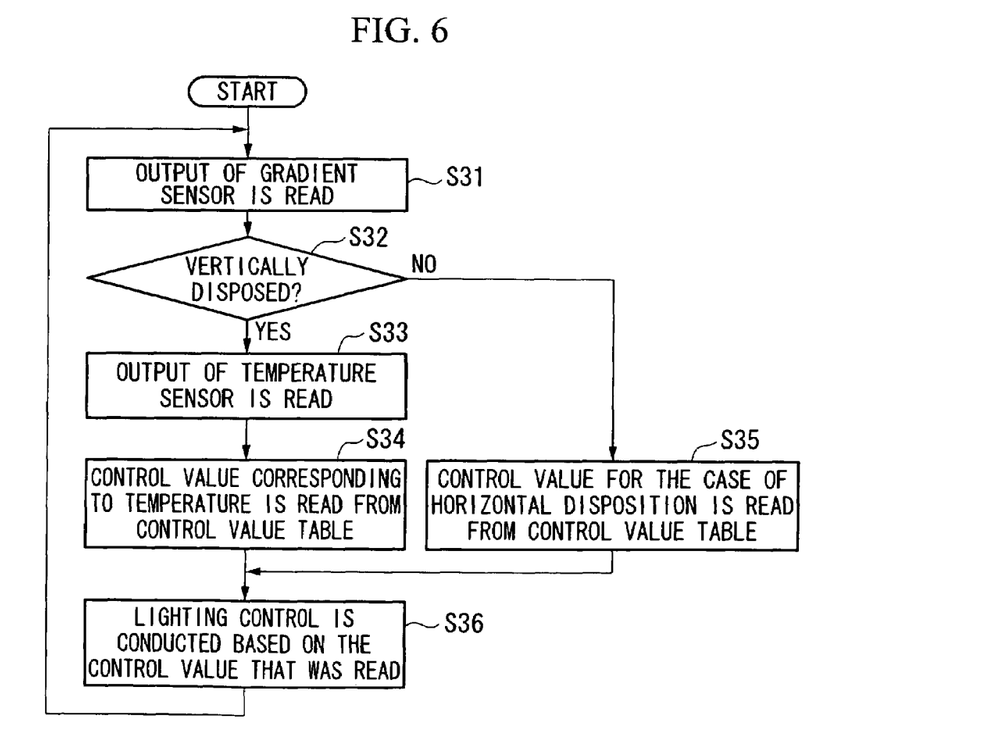
FIG. 6 is a flowchart which shows the operations of the apparatus shown in FIG. 5.

Next, a description is given of the operations of the display apparatus shown in FIG. 5 with reference to FIG. 6. FIG. 6 is a flowchart which shows the operations of the display apparatus shown in FIG. 5. First, when the power source of the display apparatus is turned on, and when it is necessary for the surface light source 2 to conduct light emission, the controller 4 reads the output of the gradient sensor 5 (step S31). Based on the output value of the gradient sensor 5 that was read, the controller 4 discriminates whether or not the CCFL 1 is in a state of vertical disposition (step S32). When it is determined as a result of this discrimination that the CCFL 1 is vertically disposed, the controller 4 reads the output of the temperature sensor 62 (step S33). The controller 4 then reads the control value corresponding to the temperature of the CCFL 1 when vertically disposed from the control value table 83 (step S34). On the other hand, when the CCFL 1 is not vertically disposed, the controller 4 reads the control value for the case of horizontal disposition from the control value table 83 (step S35). The controller 4 then conducts lighting control by outputting the control value that was read to the inverter circuit 3 (step S36). The controller 4 repetitively performs the processing operations shown in FIG. 6 when it is necessary to have the surface light source 2 conduct light emission.

By this means, when the CCFL 1 is vertically disposed, luminance adjustment is conducted with control values corresponding to the detected temperature of the CCFL 1, with the result that vaporized mercury (Hg+) inside the CCFL 1 exists without bias toward one of the electrodes, thereby enabling avoidance of occurrence of a cataphoresis phenomenon, and enabling conduct of stable lighting. Consequently, it is possible to prevent occurrence of luminance irregularities and color irregularities of the CCFL 1 in the display apparatus.

Fourth Embodiment

Figure 7:
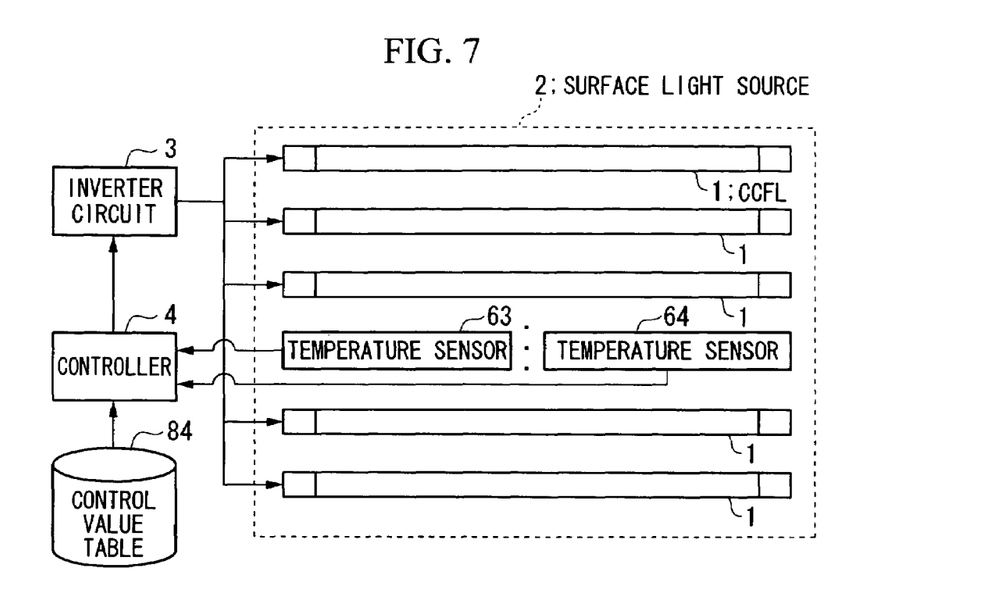
FIG. 7 is a block diagram which shows the configuration according to a fourth embodiment of the present invention.

Next, the display apparatus according to a fourth embodiment is described with reference to drawings. FIG. 7 is a block diagram which shows the configuration of this embodiment. In this figure, the same reference symbols are given to components that are identical to those of the apparatus shown in FIG. 5, and description thereof is omitted. The display apparatus shown in this figure differs from the apparatus shown in FIG. 5 in that—in place of the gradient sensor 5 and temperature sensor 62—it is newly provided with a temperature sensor 63 (first temperature detector) and temperature sensor 64 (second temperature detector) which detect temperature in the respective vicinities of both ends (both electrodes) of the CCFL 1 composing the surface light source 2, and in that the control values stored in the control value table 83 are different.

Figure 8:
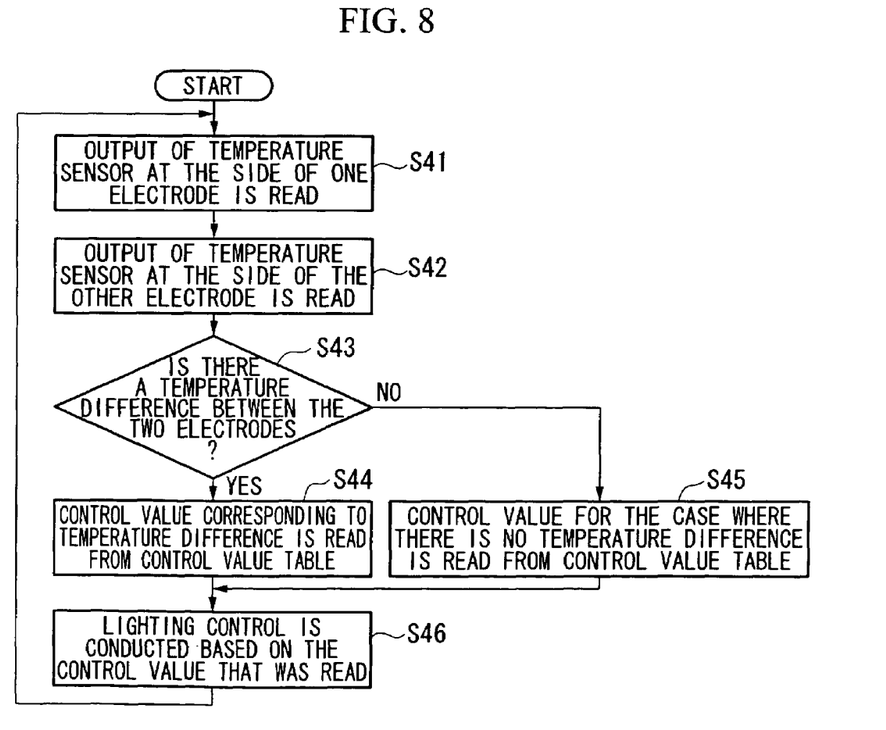
FIG. 8 is a flowchart which shows the operations of the apparatus shown in FIG. 7.

Next, a description is given of the operations of the display apparatus shown in FIG. 7 with reference to FIG. 8. FIG. 8 is a flowchart which shows the operations of the display apparatus shown in FIG. 7. First, when the power source of the display apparatus is turned on, and when it is necessary for the surface light source 2 to conduct light emission, the controller 4 reads the output of the temperature sensor 63 provided at one side of the electrodes (step S41), and reads the output of the temperature sensor 64 provided at the other side of the electrodes (step S42). The controller 4 then discriminates whether or not there is a temperature difference between both ends based on the difference in output values of the two temperature sensors 63 and 64 that were read (step S43). With respect to this discrimination, when it is found that a difference in temperature exists at both ends after taking account of detection errors of the two temperature sensors 63 and 64, it is determined that a temperature difference exists between both ends.

When it is determined as a result of this discrimination that a temperature difference exists between both ends, the controller 4 reads the control value corresponding to the temperature difference between both ends of the CCFL 1 from a control value table 84 (step S44). On the other hand, when it is determined that no temperature difference exists between both ends, the controller 4 reads the control value for the case of no temperature difference from the control value table 83 (step S45). The controller 4 then conducts lighting control by outputting the control value that was read to the inverter circuit 3 (step S36). The controller 4 repetitively performs the processing operations shown in FIG. 8 when it is necessary to have the surface light source 2 conduct light emission.

By this means, when a temperature difference exists between both ends of the CCFL 1, luminance adjustment is conducted with control values corresponding to the temperature difference between both ends of the CCFL 1, with the result that vaporized mercury (Hg+) inside the CCFL 1 exists without bias toward one of the electrodes, thereby enabling avoidance of occurrence of a cataphoresis phenomenon, and enabling conduct of stable lighting. Consequently, it is possible to prevent occurrence of luminance irregularities and color irregularities of the CCFL 1 in the display apparatus. In particular, as two temperature sensors 63 and 64 are provided to enable detection of temperature in the vicinities of both ends of the CCFL 1, and as lighting control is conducted after discriminating whether or not a temperature difference has arisen between both ends of the CCFL 1, even when a temperature difference arises between both ends of the CCFL 1 due to effects of the usage environment or other effects, it is possible to conduct stable lighting where emitted luminance during lighting at maximum luminance is controlled so that luminance irregularities due to a cataphoresis phenomenon do not occur.

It is also acceptable to provide each of all CCFLs 1 composing the surface light source 2 with the temperature sensor 63 that conducts temperature detection in the vicinity of one end and the temperature sensor 64 that conducts temperature detection in the vicinity of the other end, detect temperature differences between both ends of each CCFL 1, and conduct control of emitted luminance. In this case, among the CCFLs 1 composing the surface light source 2, the CCFL 1 with the largest temperature difference is identified, lighting control that lowers the emitted luminance of this CCFL 1 is conducted, and the emitted luminances of the CCFLs 1 other than this CCFL 1 with the largest temperature difference are subjected to lighting control so as to conform to the emitted luminance of the CCFL 1 with the largest temperature difference. By this means, it is possible to prevent occurrence of luminance irregularities due to individual differences among the CCFLs 1 composing the surface light source 2. Moreover, it is possible to conduct lighting control of a surface light source in which the axial directions of the CCFLs 1 composing the surface light source 2 do not match.

In the above-described embodiments, the luminance of the screen is lowered when conducting control that limits lighting at maximum luminance so that a cataphoresis phenomenon does not arise in the CCFL 1, and it is possible that the user may experience a sense of discomfort due to the change in luminance. Thus, as shown in part (b) of FIG. 9, the controller 4 may use an OSD (on-screen display) display function to display on the screen (image display unit) a message notifying the user that CCFL lighting has been limited. By this means, even when the luminance of the screen is lowered, it is possible for the user to perceive that limitation processing has been automatically conducted in the display apparatus.

Thus, when conditions facilitating occurrence of a cataphoresis phenomenon in the CCFL are detected, control is conducted so that the emitted luminance of the CCFL is inhibited so as to suppress the amount of heat release, and thereby enlargement of temperature differences between the two electrodes is prevented. As a result, there is no need for the user of the display apparatus to conduct a deliberate act of manually adjusting the lighting conditions of the CCFL, and that it is possible conduct use under lighting conditions of maximum usable luminance. Furthermore, as acceleration in the degradation of the CCFL can be inhibited, it is possible to achieve a display apparatus that preserves stable luminance and color over long periods. In particular, when conducting work involving the conduct of various types of medical diagnosis using images displayed on a display apparatus, it is often the case that occurrence of luminance irregularities is more problematic than a lowering of overall luminance, and that it is important to eliminate luminance irregularities even when overall emitted luminance is lowered. In such situations, the above-described luminance control is most effective.

It is also acceptable to record a program for implementing the functions of the processors of FIG. 1 in a computer readable recording medium, have the program that is recorded in this recording medium loaded onto a computer system, and conduct emitted luminance control processing by running the program. The "computer system" referred to here includes the OS and hardware such as peripheral equipment. Moreover, "a computer readable recording medium" signifies a portable medium such as a flexible disk, opto-magnetic disk, ROM, and CD-ROM, as well as a recording device such as a hard disk built into the computer system. Furthermore, "a computer readable recording medium" also includes that which retains the program for a fixed period of time, like the volatile memory (RAM) in computer systems that become a server or a client in the case where the program is transmitted via a network such as the internet or via telecommunication circuits such as telephone circuits.

The aforementioned program may also be transmitted from a computer system which stores this program in a recording device or the like to another computer system, via a transmission medium, or by transmitted waves in the transmission medium. Here, the "transmission medium" which transmits the program signifies a medium having the function of transmitting information, like a network (communication network) such as the internet, or telecommunication circuits (telecommunication lines) such as telephone circuitry. The aforementioned programs may be programs that implement a portion of the above-described functions. Furthermore, they may also be programs that enable implementation of the above-described functions in combination with programs already recorded in the computer system, so-called differential files (differential programs).

INDUSTRIAL APPLICABILITY

The present invention can be applied to the luminance control method for an image display apparatus. According to the display apparatus and the luminance control method for the present invention, it is possible to avoid a cataphoresis phenomenon in the CCFL, and prevent acceleration of the degradation thereof.

The invention claimed is:

1. A display apparatus, comprising:
a cold cathode fluorescent lamp as a light source;
a screen comprising a long side coinciding with an axial direction of the cold cathode fluorescent lamp;
a gradient detector which comprises a sensor detecting a degree of an inclination of the cold cathode fluorescent lamp, wherein the gradient sensor detects a condition in which one end of the cold cathode fluorescent lamp is disposed higher than an other end thereof; and
a controller which conducts a control so that emitted luminance of the cold cathode fluorescent lamp is inhibited when the condition in which the one end of the cold cathode fluorescent lamp is disposed higher than the other end thereof is detected by the gradient detector.

2. The display apparatus according to claim 1, further comprising an image display unit which displays a message, wherein the controller causes the image display unit to display a message indicating that control of emitted luminance is performed when control of emitted luminance of the cold cathode fluorescent lamp is conducted.

3. The display apparatus according to claim 1, wherein the screen switches between a horizontally long screen configuration in which the long side is arranged horizontally and a vertically long screen configuration in which the long side is arranged vertically,
wherein the gradient detector detects whether the screen is in the horizontally long screen configuration or in the vertically long screen configuration, and
wherein the controller conducts a control such that the emitted luminance of the cold cathode fluorescent lamp is inhibited when a condition in which the screen is in the vertically long screen configuration is detected by the gradient detector.

4. The display apparatus according to claim 1, wherein the controller conducts a control such that the emitted luminance of the cold cathode fluorescent lamp is inhibited when a condition, in which the long side is arranged vertically, is detected by the gradient detector.

5. A display apparatus, comprising:
a cold cathode fluorescent lamp as a light source;
a screen comprising a long side coinciding with an axial direction of the cold cathode fluorescent lamp;
a temperature detector which detects an internal temperature of a housing of the display apparatus;
a time measurement unit which measures an elapsed time from initiation of lighting of the cold cathode fluorescent lamp;
a gradient detector which comprises a sensor detecting a degree of an inclination of the cold cathode fluorescent lamp, wherein the gradient sensor detects a condition in which one end of the cold cathode fluorescent lamp is disposed higher than an other end thereof; and
a controller which projects a saturation temperature of the cold cathode fluorescent lamp based on the elapsed time and an internal temperature difference of the housing between a time of the initiation of lighting of the cold cathode fluorescent lamp and a present time, and which conducts a control so that emitted luminance of the cold cathode fluorescent lamp is inhibited in accordance with the saturation temperature, when the condition in which the one end of the cold cathode fluorescent lamp is disposed higher than the other end thereof is detected by the gradient detector.

6. The display apparatus according to claim 5, further comprising an external temperature detector which detects an external temperature of the housing,
wherein the controller conducts correction of the projected saturation temperature according to a temperature difference between an external temperature of the housing and an internal temperature of the housing at a present time.

7. The display apparatus according to claim 6, further comprising an image display unit which displays a message, wherein the controller causes the image display unit to display a message indicating that control of emitted luminance is performed when control of emitted luminance of the cold cathode fluorescent lamp is conducted.

8. The display apparatus according to claim 6, wherein the screen switches between a horizontally long screen configuration in which the long side is arranged horizontally and a vertically long screen configuration in which the long side is arranged vertically, wherein the gradient detector detects whether the screen is in the horizontally long screen configuration or in the vertically long screen configuration, and wherein the controller conducts a control such that the emitted luminance of the cold cathode fluorescent lamp is inhibited when a condition in which the screen is in the vertically long screen configuration is detected by the gradient detector.

9. The display apparatus according to claim 5, further comprising an image display unit which displays a message, wherein the controller causes the image display unit to display a message indicating that control of emitted luminance is performed when control of emitted luminance of the cold cathode fluorescent lamp is conducted.

10. A display apparatus, comprising:
a cold cathode fluorescent lamp as a light source;
a screen comprising a long side coinciding with an axial direction of the cold cathode fluorescent lamp;
a gradient detector which comprises a sensor detecting a degree of an inclination of the cold cathode fluorescent lamp, wherein the gradient sensor detects conditions in which one end of the cold cathode fluorescent lamp is disposed higher than an other end thereof;
a temperature detector which detects a temperature of the cold cathode fluorescent lamp; and
a controller which conducts a control so that emitted luminance of the cold cathode fluorescent lamp is inhibited according to the temperature detected by the temperature detector, when the condition in which the one end of the cold cathode fluorescent lamp is disposed higher than the other end thereof is detected by the gradient detector.

11. The display apparatus according to claim 10, further comprising an image display unit which displays a message, wherein the controller causes the image display unit to display a message indicating that control of emitted luminance is performed when control of emitted luminance of the cold cathode fluorescent lamp is conducted.

12. The display apparatus according to claim 10, wherein the screen switches between a horizontally long screen configuration in which the long side is arranged horizontally and a vertically long screen configuration in which the long side is arranged vertically, wherein the gradient detector detects whether the screen is in the horizontally long screen configuration or in the vertically long screen configuration, and wherein the controller conducts a control such that the emitted luminance of the cold cathode fluorescent lamp is inhibited when a condition in which the screen is in the vertically long screen configuration is detected by the gradient detector.

13. A luminance control method for a display apparatus comprising a cold cathode fluorescent lamp as a light source and a screen comprising a long side coinciding with an axial direction of the cold cathode fluorescent lamp, the method comprising:

a gradient detection of detecting a degree of an inclination of the cold cathode fluorescent lamp, wherein the gradient detection comprises detecting a condition in which one end of the cold cathode fluorescent lamp is disposed higher than an other end thereof; and conducting a control so that emitted luminance of the cold cathode fluorescent lamp is inhibited when the condition in which one end of the cold cathode fluorescent lamp is disposed higher than the other end thereof is detected by the gradient detection.

14. A luminance control method for a display apparatus comprising a cold cathode fluorescent lamp as a light source and a screen comprising a long side coinciding with an axial direction of the cold cathode fluorescent lamp, the method comprising:

a temperature detection of detecting an internal temperature of a housing of the display apparatus;

a time measurement of measuring an elapsed time from initiation of lighting of the cold cathode fluorescent lamp;

a gradient detection of detecting a degree of an inclination of the cold cathode fluorescent lamp, wherein the gradient detection comprises detecting a condition in which one end of the cold cathode fluorescent lamp is disposed higher than an other end thereof; and projecting a saturation temperature of the cold cathode fluorescent lamp based on the elapsed time and an internal temperature difference of the housing between a time of the initiation of lightning of the cold cathode fluorescent lamp and a present time, and conducting a control so that emitted luminance of the cold cathode fluorescent lamp is inhibited in accordance with the saturation temperature, when the condition in which the one end of the cold cathode fluorescent lamp is disposed higher than the other end thereof is detected by the gradient detection.

15. A luminance control method for a display apparatus comprising a cold cathode fluorescent lamp as a light source and a screen comprising a long side coinciding with an axial direction of the cold cathode fluorescent lamp, the method comprising:

a gradient detection of detecting a degree of an inclination of the cold cathode fluorescent lamp, wherein the gradient detection comprises detecting a condition in which one end of the cold cathode fluorescent lamp is disposed higher than an other end thereof;

a temperature detection of detecting a temperature of the cold cathode fluorescent lamp; and conducting a control so that emitted luminance of the cold cathode fluorescent lamp is inhibited according to the temperature detected by the temperature detection when the condition in which the one end of the cold cathode fluorescent lamp is disposed higher than the other end thereof is detected by the gradient detection.

16. A display apparatus, comprising:
a light source;
a screen which comprises a long side, and switches between a horizontally long screen configuration in which the long side is arranged horizontally and a vertically long screen configuration in which the long side is arranged vertically;
a gradient detector which comprises a sensor detecting whether the screen is in the horizontally long screen configuration or in the vertically long screen configuration; and
a controller which conducts a control such that emitted luminance of the light source is inhibited when a condition in which the screen is in the vertically long screen configuration is detected by the gradient detector.

* * * * *